United States Patent [19]
Scifres

[11] Patent Number: 6,025,942
[45] Date of Patent: Feb. 15, 2000

[54] INFRARED LASER DIODE WIRELESS LOCAL AREA NETWORK

[75] Inventor: Donald R. Scifres, San Jose, Calif.

[73] Assignee: SDL, Inc., San Jose, Calif.

[21] Appl. No.: 08/827,093

[22] Filed: Mar. 27, 1997

Related U.S. Application Data

[63] Continuation of application No. 08/317,889, Oct. 4, 1994.

[51] Int. Cl.[7] .......................... H04J 14/02; H04B 10/04; H04B 10/24
[52] U.S. Cl. .......................... 359/125; 359/133; 359/152; 359/153; 359/159; 359/172; 359/180; 359/173
[58] Field of Search .................................. 359/125, 133, 359/152, 153, 159, 172, 124, 180, 193; 372/6

[56] References Cited

U.S. PATENT DOCUMENTS

| | | | |
|---|---|---|---|
| 3,792,379 | 2/1974 | Auston | 359/184 |
| 4,017,146 | 4/1977 | Lichtman | 350/7 |
| 4,450,319 | 5/1984 | Lucey | 359/182 |
| 4,493,114 | 1/1985 | Geller | 359/184 |
| 4,648,131 | 3/1987 | Kawaguchi | 359/172 |
| 4,710,914 | 12/1987 | Robieux | 359/152 |
| 4,712,859 | 12/1987 | Albanese | 359/120 |
| 4,809,257 | 2/1989 | Gantenbein | 359/172 |
| 4,959,874 | 9/1990 | Saruta | 359/172 |
| 4,977,619 | 12/1990 | Crimmins | 359/172 |
| 4,982,445 | 1/1991 | Grant et al. | 455/606 |
| 5,159,480 | 10/1992 | Gordon et al. | 359/181 |
| 5,181,135 | 1/1993 | Keeler | 359/141 |
| 5,227,908 | 7/1993 | Henmi | 359/154 |
| 5,229,593 | 7/1993 | Cato | 250/205 |
| 5,237,634 | 8/1993 | Follis | 385/31 |
| 5,321,542 | 6/1994 | Freitas et al. | 359/172 |
| 5,321,718 | 6/1994 | Waarts | 372/108 |
| 5,347,387 | 9/1994 | Rice | 359/152 |
| 5,359,446 | 10/1994 | Johnson | 359/172 |
| 5,457,561 | 10/1995 | Taneya | 359/172 |
| 5,499,262 | 3/1996 | Nakata | 372/108 |
| 5,528,391 | 6/1996 | Elrod | 359/159 |
| 5,532,858 | 7/1996 | Hirohashi et al. | 359/172 |
| 5,680,241 | 10/1997 | Sakanaka et al. | 359/172 |
| 5,710,652 | 1/1998 | Bloom et al. | 359/152 |

FOREIGN PATENT DOCUMENTS

| | | | |
|---|---|---|---|
| 1202535 | 9/1986 | Japan | 359/124 |

OTHER PUBLICATIONS

Closs, "Wireless Connection Between A Controller and a Plurality of Terminals", IBM Tech Disclosure vol 20 #7, Dec. 1977.

Payne, "Wavelength Switched Passively Coupled Single Mode Optical Networks", IOOC–ECOC, 1985 pp 585–588.

Barry, "I GBPS Space Laser Communication System" ESCON '76 pp. 134A–134G, Sep. 29, 1976.

*Primary Examiner*—Leslie Pascal
*Attorney, Agent, or Firm*—Harness, Dickey & Pierce, P.L.C.

[57] ABSTRACT

An infrared laser diode wireless local area network for communication between spatially dispersed terminals such as computers which may be located in a single room or in adjacent rooms. The lasers may be tuned to emit at varying frequencies for wavelength multiplexing, or a plurality of lasers each having a different output frequency can be connected with each terminal. A receiver connected to each terminal may similarly detect only a single narrow waveband or may detect a plurality of such wavebands. A transceiver may be employed for signal transmission between separate rooms. High speed data modulation of the carrier waves is provided with MOPA or similar lasers, and broad angular dispersion of the output is achieved by such lasers along with dispersive lenses.

59 Claims, 4 Drawing Sheets

INFRARED LASER DIODE WIRELESS LOCAL AREA NETWORK

This is a continuation of U.S. patent application Ser. No. 08/317,889, filed Oct. 4, 1994.

TECHNICAL FIELD

This invention relates to wireless local area networks for communication between computers or other terminals.

BACKGROUND ART

Local area networks (LANs) typically provide for communication between computer terminals located in the same room, building or complex of buildings by electronic connection between the terminals with conductive wires or optical fibers. Wireless communication between terminals using infrared (IR) light emitting diodes (LEDs) is known but suffers from several drawbacks. One drawback of IR LEDs is a lack of connectivity at distances over perhaps fifty feet that is caused by reduction of signal intensity to power levels inadequate to distinguish over ambient IR noise. Another drawback is that of crosstalk between terminals, so that information transmitted from a terminal is not clearly received by another terminal.

Some prior art systems for infrared communication use mirrors to deflect the light between stations. In U.S. Pat. No. 4,017,146, Lichtman teaches angular distribution of a concentrated laser beam by deflecting the beam with a moving mirror so that the beam raster scans over a large angle. The beam impinges upon a given spatial location in short pulses that amount to a small fraction of a given time period, the remainder of the time period being essentially devoid of the beam at that location, and thus the transmission of data being similarly limited. U.S. Pat. No. 4,982,445 to Grant et al. teaches a laser beam communication system for spacecraft utilizing mirrors positioned in the path of the beams which adjust reflection to different angles.

Other systems employ high and low data transmission channels. U.S. Pat. No. 5,321,542 to Frietas et al. teaches an optical communications system utilizing a high bandwidth, high speed infrared data channel along with a more robust, low bandwidth, low speed infrared channel for maintaining communication when the high speed channel is obstructed. U.S. Pat. No. 5,229,593 to Cato teaches a free space laser communication system operating at a high power level for optimum data transmission when a path between terminals is not blocked, and operating at a lower, eye-safe power level when the path between terminals is obstructed.

Still other systems have characteristics that depend upon the medium of transmission. U.S. Pat. No. 5,227,908 to Henmi teaches an intensity modulated infrared signal for improved noise reduction transmission via an optical fiber. U.S. Pat. No. 5,181,135 to Keeler uses light sources tuned for minimizing losses in an underwater communications system. U.S. Pat. No. 5,159,480 to Gordon et al. teaches a communication system for naval vessels that sends out a horizontally dispersed, vertically concentrated infrared signal for receipt by a remote receiver.

Despite these advances in free space communication, certain obstacles remain. Some known systems utilize a form of time multiplexing to avoid confusion between signals from different terminals, thus cutting into the time available for data transfer between separate terminals. Similarly, the frequency with which infrared diodes can be modulated also can limit the speed with which data can be transferred. Moreover, detection of the signals is often thwarted by ambient infrared noise. Furthermore, a free space local area network including terminals disposed in separate rooms has difficulties caused by walls separating the rooms. The term "free space" is meant to signify that a path through air is available between terminals, although the path need not necessarily be direct. For the situation in which walls substantially seal one room from another, a free space path is not present.

It is an object of the present invention to overcome the aforementioned obstacles.

SUMMARY OF THE INVENTION

The above object is accomplished by providing a wireless local area network of separate terminals each of which has a connected transmitter and receiver. The transmitters include a laser diode with an angularly dispersed, narrow bandwidth infrared output, and the receivers have the capability to detect infrared radiation at frequencies emitted by the transmitters. Each terminal can send data to separate terminals by modulating the output of its connected transmitter, and each terminal can receive data from a separate terminal by demodulating radiation detected by its connected receiver.

To avoid confusion between signals of different terminals, the infrared carrier wavelengths transmitted by different terminals can be mutually exclusive, i.e. wavelength diverse. This wavelength diversity allows an increase in the time during which data can be transmitted and received, since signals can be sent simultaneously between various transmitters and receivers rather than by time multiplexing the signals so that only one transmitter and one receiver are actively communicating at any given time. The increase in signal time afforded by wavelength diversity becomes more pronounced as the number of terminals in a network are increased.

The speed of data transmission between terminals can alternatively be increased by increasing the speed with which the transmitters can be modulated. In this regard, laser diodes can be modulated at a much higher frequency than the light emitting diodes that are usually employed for wireless networking. By employing amplitude modulation of laser diodes, the modulation frequency can be in excess of a gigahertz. Due to this high modulation frequency, the terminals can be time multiplexed rather than wavelength diverse, using a time multiplexing protocol such as that offered under the trademark "Ethernet". High power output can be achieved with a low modulation current by modulating a fraction of the gain region, such as with a master oscillator power amplifier (MOPA) or flared resonant cavity laser diode.

The output signal from each transmitter is broadcast over a large area at an intensity which can be detected by various receivers. This can be accomplished, first, by limiting the bandwidth of the transmitted signal, to facilitate detection of the signal over ambient noise. Second, the laser diode can be fashioned to have a high output power that is broadcast over a large area so that the intensity at any localized area is eye-safe, by employing lasers with flared outputs for high power, angularly dispersed beams. A dispersive lens can also be disposed in front of the laser output with associated safety switches that terminate the output upon removal of the lens. Alternatively, a fiber coupled laser diode or laser bar array coupled to an array of fibers which are later either bundled or dispersed in space allow for safe levels of light output intensity. A novel laser diode having opposed flared outputs can be used for increased angular dispersion of the output.

Output dispersion over a broad solid angle is generally desirable for the networking of the present invention, a broad solid angle being defined in this application as at least 45° in any direction across the beam that includes its axis.

For the situation in which free space transmission between terminals located in a single room is not possible, transmission schemes based upon various networking geometries are presented. For common corporate environments that have large rooms that are subdivided into cubicles by partitions that extend partially to the ceiling to provide individual work rooms, transceiving terminals mounted on the ceiling are employed to ensure data transmission between terminals in separate cubicles. Other buildings may have individual rooms but a mostly common crawl space or attic above most of the rooms, and ceiling mounted transceiving terminals can again be employed, which communication between those transceiving terminals occurring via the crawl space. Still other buildings with individual rooms are connected by doors with access to common hallways, and transceiving terminals can be mounted adjacent the doors, allowing communication via the hallways.

BEST MODE FOR CARRYING OUT THE INVENTION

Figure 1:
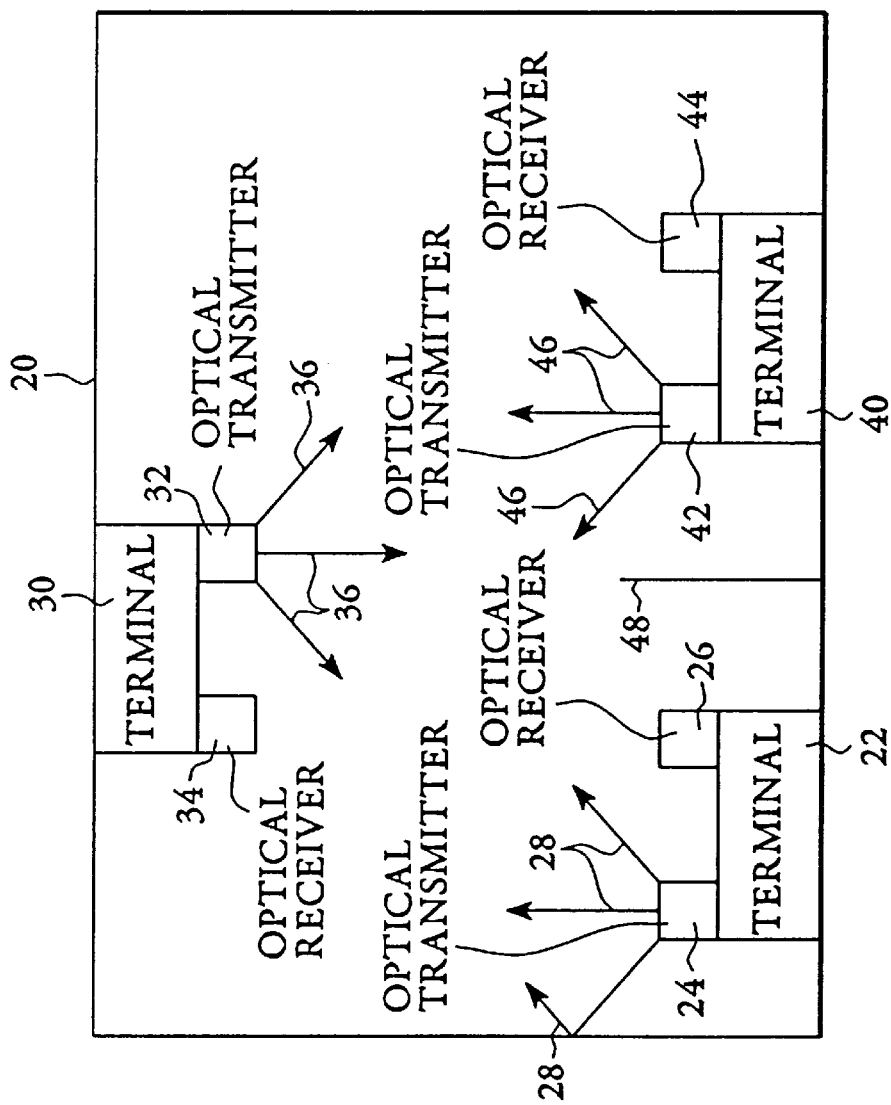
FIG. 1 is a plan view of a system of the present invention having several terminals with associated transmitters and receivers disposed in a room.

With reference to FIG. 1, a multi-terminal network of the present invention is shown disposed within a room 20. A first terminal 22 has a connected transmitter 24 and receiver 26. The transmitter 24 contains at least one laser diode which emits an angularly dispersed infrared output represented by arrows 28. The output 28 has a narrow frequency band centered about a frequency $F_1$. A second terminal 30 has a connected transmitter 32 and receiver 34. The transmitter 32 contains at least one laser diode that emits a broadly dispersed infrared output represented by arrows 36. The output 36 has a narrow frequency band centered about a frequency $F_2$. The frequency bands of outputs 28 and 36 are mutually exclusive. A third terminal 40 has a similar connected transmitter 42 and receiver 44, the transmitter 42 having at least one laser diode which emits an angularly dispersed output represented by arrows 46 and which has a narrow frequency band centered about a frequency $F_3$, that band exclusive of the frequency bands centered about $F_1$ and $F_2$.

In this embodiment, the terminals 22, 30 and 40 each have a characteristic output frequency, $F_1$, $F_2$ and $F_3$, respectively, that acts to identify the terminal as well as avoid crosstalk between signals. The receivers 26, 34 and 44 each have means for detecting the output frequencies of the separate terminals and excluding other frequencies. The means for detecting certain frequencies while excluding others can include frequency specific filters disposed in front of photodetectors capable of detecting low intensity level infrared light of any frequency. Alternatively, or photodetectors that are sensitive to only selected frequencies may be employed, as will be explained in more detail later.

In another embodiment, the terminals can be identified by characteristic input frequencies $F_4$, $F_5$ and $F_6$ detected by their receivers 26, 34 and 44, respectively. Thus to send data from terminal 22 to terminal 30, the transmitter 24 of terminal 22 would output signals at a carrier frequency matching input frequency $F_5$. The transmitters 24, 32 and 42 can be made to emit infrared light at the desired frequencies by several means which will be discussed in greater detail below, including the use of multiple laser diodes connected to each terminal or the employment of tunable laser diodes.

In either of the above embodiments, the room 20 may be divided into separate working areas or cubicles by partitions such as wall 48 that extends partially across the room 20. For this situation the terminal 30 that is associated with an open portion of the room 20 may serve as a base terminal or relay station for other terminals that are separated by the wall 48, such as terminals 22 and 40. A few bare terminals such as terminal 30 may be sufficient for networking a large room having many individual cubicles.

Figure 2:
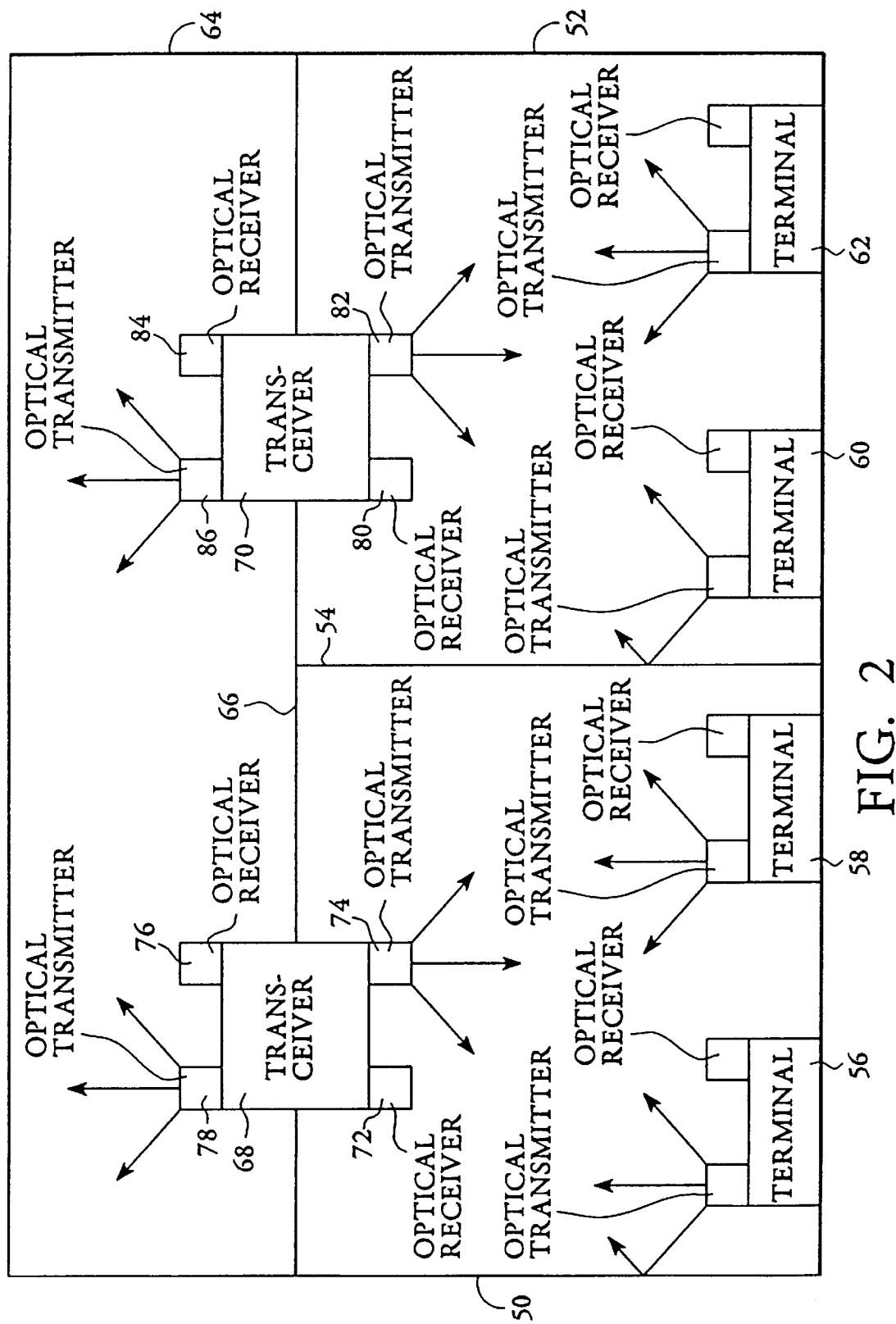
FIG. 2 is a plan view of a system of FIG. 1 including transceivers for communicating between terminals disposed in separate rooms.

While free space networking within a single room can be relatively straightforward, other network environments are more problematical. FIG. 2 shows a network environment involving a first room 50 separated from a second room 52 by a wall 54 which is impervious to infrared radiation. A pair of separate terminals 56 and 58 are disposed in the first room 50 while another pair of terminals 60 and 62 are disposed in the second room 52. A free space area 64 adjoins both of the rooms across a wall 66. The free space area 64 may be an attic or crawl space above the rooms 50 and 52, or it may be a hallway next to the rooms 50 and 52 separated from those rooms by doors, not shown, in the wall 66.

A first transceiver 68 is disposed in the wall 66 between the first room 50 and the free space 64, and a second transceiver 70 is disposed in the wall 66 between the second room 52 and the free space 64. The transceivers 68 and 70 act as relays for signals between the first and second rooms 50 and 52. Each of the transceivers 68 and 70 has at least one transmitter and at least one receiver on each side of the wall 66. Thus transceiver 68 has a receiver 72 and a transmitter 74 disposed within room 50, and a receiver 76 and transmitter 78 facing into the free space 64, and transceiver 70 has a receiver 80 and a transmitter 82 disposed within room 52, and a receiver 84 and a transmitter 84 disposed within free space 64. In operation, for example, a signal from terminal 56 in room 50 is detected by receiver 72 of transceiver 68, which then rebroadcasts the signal via transmitter 78 into free space 64 where it is detected by receiver 84 on transceiver 70. Transmitter 82 of that transceiver 70 then rebroadcasts the signal by transmitter 82 into room 52 to be detected by a receiver associated with terminal 62, which then demodulates the signal to acquire data.

For the situation in which the free space 64 is a common hallway, the transceivers 68 and 70 can be mounted adjacent to light switches that are typically found on walls next to doors into the hallway. When the free space 64 is an attic, an extension may be provided to the transmitters and receivers disposed in the attic to allow protrusion above insulation or other materials that may be found in the attic. Alternatively, the transceivers can be connected by wiring, so that the transmitters and receivers disposed in the free space are not necessary. It is also possible to provide a transceiver, not shown, in the wall 54 that separates adjoining rooms 50 and 52, for transmission directly between those rooms rather than via the free space 64. In each of these situations, additional transceivers can be added that serve as relays to link additional terminals. The slight delay in the signals caused by the rebroadcasting of the transceivers does not typically present a problem since the transceivers allow infrared communication between regions that are not otherwise in such communication.

In order to provide an angularly dispersed and high power output using limited modulation current, laser diodes having gain regions that are flared in one dimension such as a master oscillator power amplifier (MOPA) or flared resonant cavity laser are employed in the transmitters. Additional angular dispersion is provided by a dispersive lens or one or more optical fibers. In general, a dispersion of output radiation over an angle of at least 45° in all directions from a central axis is preferable for ensuring communication between terminals in a single room. Additional spatial dispersion may occur due to reflection of the radiation from walls and other objects.

Figure 3:
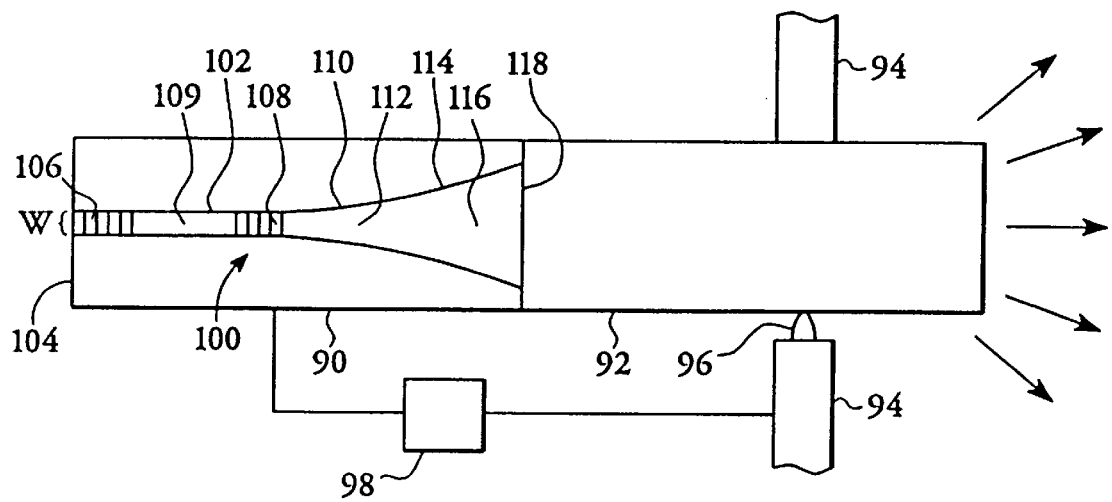
FIG. 3 is a top plan view of a MOPA laser transmitter of FIG. 1 with an output shielded by a dispersive lens.

In FIG. 3, a MOPA laser 90 is shown with a rod 92 disposed in front of an infrared output of the laser 90. The rod 92 may be made of glass, plastic or other material that is translucent to the infrared output. This dispersive translucence can be achieved with microscopic scattering particles diffused throughout the rod 92, which may give the rod a milky appearance. Alternatively, the rod 92 can have bends that act to disperse the output to divergent angles. The output radiation need not be coherent for communication since the modulation frequency, which may exceed a gigahertz, is still many orders less than the carrier frequency. The rod 92 is held in a case 94 that has a safety switch 96 pressing upon the rod 92. The laser 90 is powered by a power supply 98 that is connected to the safety switch 96. Should the rod 92 be removed from the casing 94, the safety switch 96 operates to cut off the power to the laser 90 and the output from the laser 90 is stopped.

The MOPA laser 90 has a gain region 100 which has several sections, each of which has independent electrical connections so as to allow substantially independent generation of light emission conditions in the different sections. The gain region 100 has a substantially uniform thickness in a direction normal to the plane of the paper of FIG. 3, that thickness being within a few orders of the wavelength of the infrared output, and bordered by a cladding material to form a waveguide for the light. As one example of materials that may be used for the infrared MOPA laser 90, the gain region 100 and the cladding material can both be formed of epitaxially grown layers of InGaAsP, with the gain region having a higher concentration of As than the cladding region. The exact concentration of the elements in this compound can be used to tailor the output wavelength to a desired value. A resonant cavity 102 acts to reflect light emitted or passing through the cavity 102 by reflecting that light with a reflective wall 104 and distributed Bragg reflector (DBR) gratings 106 and 108. A quantum well layer, not shown in this figure, having a width and thickness equal to or smaller than the wavelength of light being reflected so that a single mode of light is constructively reflected and amplified, may be present within the gain region. The resonant cavity 102 is supplied with voltage for creating an electron population inversion by a pair of opposed electrical connections, a top connection 109 illustrated in this figure.

Some of the single mode light amplified in the resonant cavity 102 is transmitted beyond DBR grating 108 and into a flared portion of the gain region 100. The flared portion could support multiple modes, but since it is being pumped with the single mode light from the resonant cavity 102, the flared portion emits light of the same phase and frequency. A modulation portion 110 of the gain region 100 is disposed in the flared portion adjacent to the resonant cavity region 102 and has a top electrical connection 112. The modulation portion 110 supplies an electrical signal from a terminal, not shown in this figure, for transmission of data from the terminal. A power amplification portion 114 of the gain region 100 is broader than the other portions and has the capability to provide more amplified light due to having a larger area available for electron population inversion. A top electrical connection 116 provides voltage to the power amplification portion 114 of the gain region 100. An output face 118 of the laser 90 has an anti-reflective (AR) coating, to maximize the transmission of the output through the face 118. The MOPA laser 90 has the ability to produce narrow bandwidth coherent light that can be modulated with a low current signal and amplified to produce a powerful, angularly dispersed output beam. Such a laser 90 can be supplied with amplitude modulations representing data for transmission at a frequency exceeding 1 gigahertz.

Figure 4:
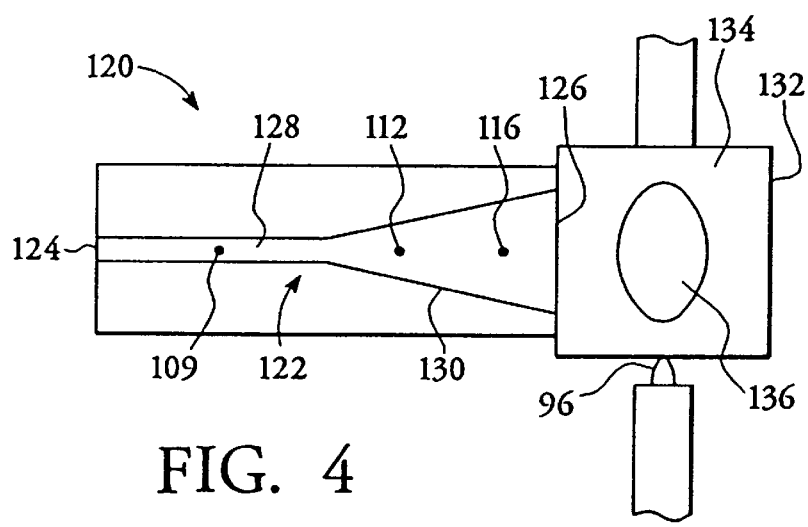
FIG. 4 is a top plan view of a flared resonant cavity laser transmitter of FIG. 1 with an output shielded by a dispersive lens.

FIG. 4 shows a similar laser 120 having a flared gain region 122 but lacking DBR reflectors. Instead, the entire gain region 122 of this laser serves as a resonant cavity, with constructive reflection occurring from a very reflective back wall 124 and a partially reflective front face 126, as well as within the narrow separation between cladding regions in a thin, parallel portion 128 of the gain region 122. Amplification and output light of this flared resonant cavity laser 120 is held to a single mode by the single mode of constructive reflection permitted in the parallel portion 128 and the lack of constructive reflection in a flared portion 130 of the gain region 122 except for light reflecting from the front face 126 back to the parallel portion 128.

Adjacent to the front face 126 of the laser 120 is a translucent dispersive lens 132 for broadcasting the output into a wide angular range. The dispersive lens has a body 134 surrounding a bubble 136, the bubble 136 having a lower index of refraction for infrared light than the body 134. For example, the body 134 may be made of glass or plastic and the bubble 136 may be made of air or a less refractive glass or plastic. The bubble 136 is aligned with the output from the laser 120 so that, due to the curvature of the bubble 136 at an interface with the body 134, output light from the laser 120 is dispersed over broadened angles. As discussed above, a safety switch presses upon the body 134, and removal of the lens 132 from the front of the laser 120 turns off power to the laser 120, avoiding eye damage from an undispersed output.

Cleaved F-P cavity lasers can also be used as well as DBR or DFB lasers. These lase in a narrow enough band to achieve wavelength division multiplexing in free space. Because they are simpler to fabricate than the MOPA they are likely to be preferred over the MOPA or flared cavity lasers. Electronically wavelength tunable DBR or DFB lasers are particularly interesting because each transmitter can arbitrarily address receiving terminals with tunable or fixed wavelength filters.

Figure 5:
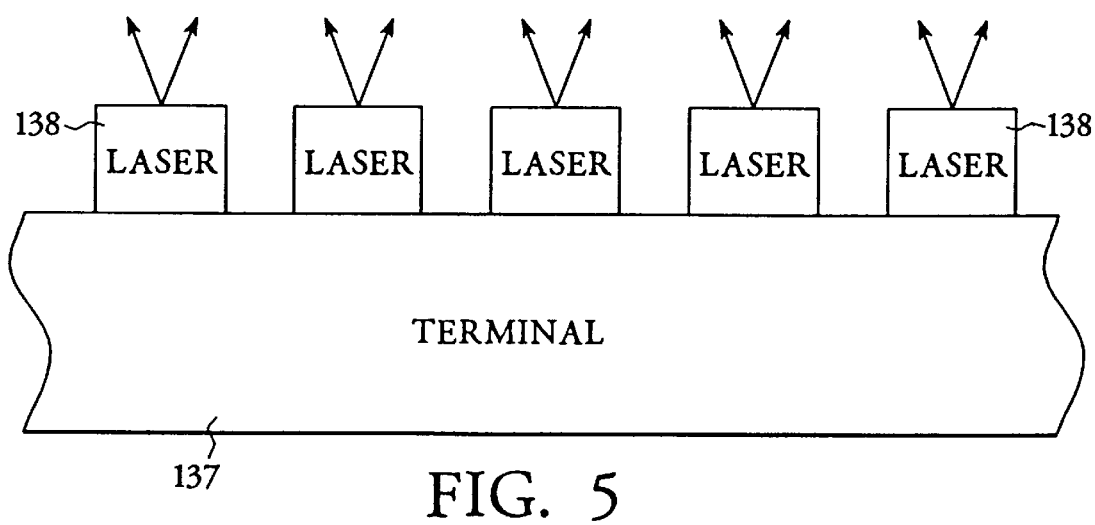
FIG. 5 is a cutaway side plan view of a terminal of FIG. 1 having a plurality of lasers that each emit infrared light at a different frequency.

Either the MOPA laser 90 or the flared resonant cavity laser 120 can be tuned to output different wavelengths of infrared light by adjusting parameters such as the current, voltage or temperature across the gain region, thereby changing the size of the resonant cavity or the effective wavelength within the resonant cavity due to changes in the index of refraction of the gain region. Such methods for tuning laser output are known and will not be discussed in detail here. Thus a single laser can broadcast over different carrier frequencies. Alternatively, a single terminal 137 can be connected with a plurality of diodes 138 which each emit infrared light at a different output frequency, as shown in FIG. 5. In this situation, a single terminal can broadcast over different carrier frequencies by selecting and providing power to a specific laser 138.

Figure 6:
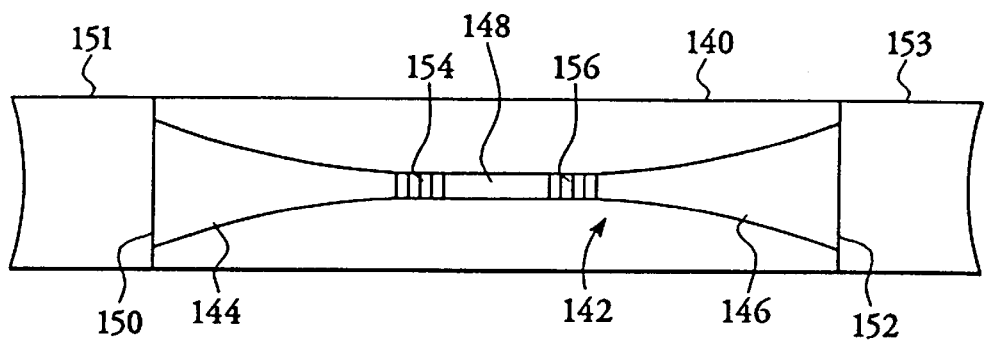
FIG. 6 is a top plan view of a dual flared MOPA laser transmitter of FIG. 1 with outputs shielded by dispersive lenses.

Referring now to FIG. 6, a MOPA laser 140 having a gain region 142 with oppositely flared gain portions 144 and 146 at opposite ends of a thin parallel portion 148 has an advantage of broadcasting a powerful, coherent output in opposite directions through low reflectivity faces 150 and 152. The parallel portion 148 is bordered by DBR reflectors 154 and 156 that help to establish single mode amplification, but a similar laser can be made without such reflectors that operates much like the resonant cavity laser 120 discussed above, provided that output faces 150 and 152 are somewhat reflective. As discussed above with regard to single-output lasers, dispersive lenses 151 and 153 are positioned adjacent to or adjoining both faces 150 and 152.

Figure 7:
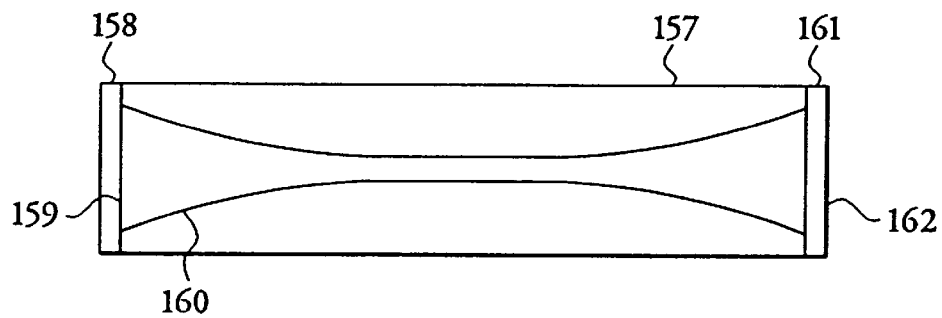
FIG. 7 is a top plan view of a dual flared resonant cavity laser transceiver of FIG. 2 with wavelength selective filters adjoining input/output faces.

A similar laser 157 shown in FIG. 7 can be employed as an optical transceiver by having an optical filter 158 adjoining an input-output face 159, the filter 158 only allowing a selected narrow band of wavelengths of infrared light to enter the a flared region 160 of the laser 157, the band of wavelengths substantially matching the output wavelength of the laser 157, the flared region 160 amplifying the light admitted through the filter 158. The filter 158 may be a Fabry-Perot interference filter made of thin dielectric films of alternating high and low index of refraction materials having quarter wavelength thickness, except for a central half wavelength thick layer. A similar filter 161 adjoins another input-output face 162 of the laser 153, so that the only light admitted into the laser for amplification is that of the selected wavelength. Since the light of the selected wavelength is constructively amplified, the filtered laser 153 acts to select and amplify the selected wavelength, acting as a repeater or relay for signals sent at the carrier frequency corresponding with that wavelength, without the necessity of electrical modulation. Since the laser is optically pumped by the signals admitted into the gain region 142, the laser 140 can rebroadcast those signals much more quickly than a transceiver that must convert optical signals to electronic signal and then back to optical signals for rebroadcasting. Dispersive lenses, not shown, may be aligned in front of filters 158 and 161, the lenses acting to angularly broadcast the signals sent out from the laser while concentrating the signals received from outside the laser 153. Additionally, the lenses may be used to extend the length of a transceiver in order to bridge a wall between separate rooms. When rebroadcast of a signal is desired in a selected direction, the flared region facing that direction can be supplied with a higher voltage than the flared region facing oppositely and receiving the signal.

Figure 8:
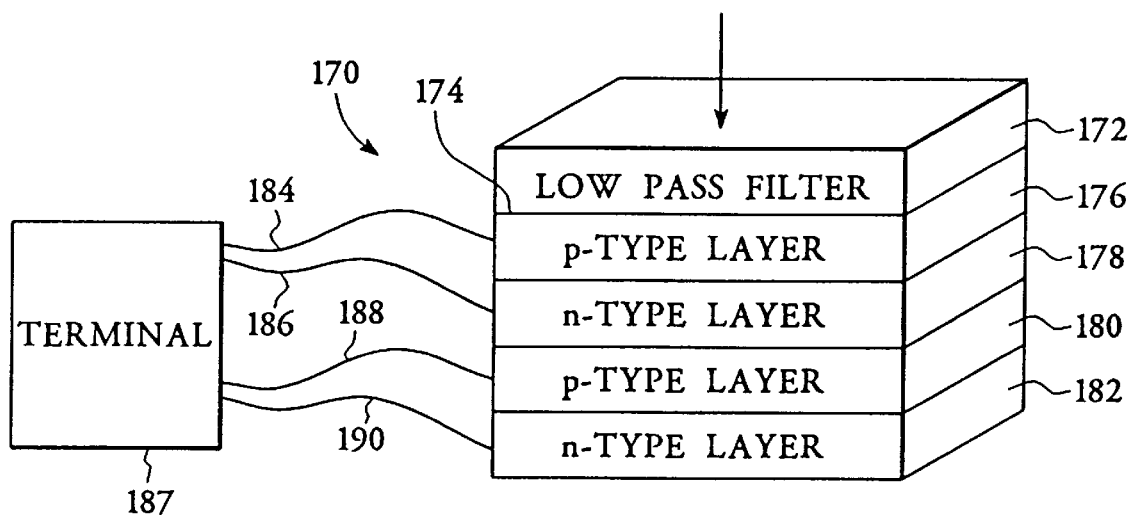
FIG. 8 is a perspective view of a frequency selective infrared receiver of FIG. 1.

Referring now to FIG. 8, a photodetector 170 which can differentiate signals of different carriers frequencies is shown with a low pass filter 172 adjoining a light receiving face 174 of the photodetector 170 in order to screen out light of higher frequency than the infrared carrier frequencies. The photodetector 170 is made from a series of PN junctions of direct bandgap semiconductors having direct bandgap energies corresponding to carrier frequencies. As discussed previously with regard to light emission, epitaxially grown layers of compounds containing InGaAsP can be selected to have appropriate bandgap energies for infrared light. A first layer 176 is p-type and a second layer 178 is n-type semiconductor having a direct bandgap equal to the highest carrier frequency desired to be detected. A photon having a frequency low enough to pass through the low pass filter 172 and matching the bandgap of n-type layer 178 will be absorbed in layer 178 by causing an electron in that layer to move to a conduction band from a valence band. An electrical current between leads 184 and 186 that are attached to layers 176 and 178, respectively, represents a number of such electrons due to a signal carried at the frequency corresponding to the bandgap of layer 178. The leads 184 and 186 are connected to a terminal 187 which reads data from the signals.

Photons having a frequency less than that of the bandgap of layer 178 pass through that layer to reach a junction between p-type layer 180 and n-type layer 182, which is a direct bandgap material having a bandgap corresponding to the next lowest carrier frequency. A pair of electrical leads 188 and 190 are connected to layers 180 and 182, respectively, to measure electrical current between layers 180 and 182. Thus photons impinging upon layer 182 having an energy corresponding to the lowest direct bandgap of layer 182, generate conduction band electrons which are measured as current or voltage representing a signal at that carrier frequency. Terminal 187 acquires this signal and, due to the different carrier frequency than the signal from leads 184 and 186, acquires data that may represent signals of a separate terminal. For clarity this photodetector is shown with only two carrier light absorbing PN junctions, while many more such junctions may be employed in a device for detecting signals at many more carrier frequencies. Also, similar devices having PIN junctions rather than PN junctions may alternatively be employed.

Alternatively, filters admitting different infrared frequencies may be used to select which carrier frequency is detected by a photodetector receiver such as a PIN diode. Fabry-Perot filters having thin layers of dielectric films may be employed for this purpose, and the filters may each adjoin a separate photodetector associated with a terminal for receiving data. Instead, various filters may all adjoin a single photodetector having the ability to differentiate which filter the light passed through. Thus, a receiver may be able to detect various carrier frequencies, or may be specific in detecting only a certain, narrow band of carrier frequencies, offering a means for identifying the receiver by the frequencies it detects. This complements a previously discussed capability of a transmitter of the present invention of selecting a transmission frequency from several available narrow-band channels or only transmitting on a single, identifying channel.

I claim:

1. A wireless communication network comprising,
a plurality of separate terminals, each terminal having band-selection means for associating said each terminal and a second terminal of said plurality of terminals with respect to a unique pair of wavelength bands of light over which said two terminals communicate, each said terminal and said second terminal thereby being in optical communication with respect to said pair of wavelength bands, a transmitter and receiver, said band-selection means including a laser diode source and means for detecting radiation, said transmitter having means for sending data to a separate terminal by modulating said output, said receiver having means for demodulating radiation detected to derive data transmitted from a separate terminal, and means, optically coupled to said band-selection means, for dispersing said output over a broad solid angle, said dispersing means including a lens positioned proximate to said laser diode source, intercepting said output, said lens having first and second areas, with said first area having a first index of refraction, and said second area having a second index of refraction, said second index of refraction being lower than said first index of refraction, with respect to said output.

2. The network of claim 1 wherein said first area is a body defining a fluid-tight volume and said second area is a gas disposed within said volume.

3. The network of claim 1 wherein said laser diode source includes a gain region and said sending means includes means, in electrical communication with said gain region, for injecting a modulated current into a sub-portion of said gain region to modulate said output at a frequency of at least one gigahertz.

4. A wireless communication system for interfacing a plurality of terminals in a free-space local area network comprising, a laser diode source associated with each of said terminals, each said source having a waveguide and means for emitting a modulated output beam, thereby transmitting data to another of said terminals, means, disposed adjacent to said waveguide to intercept said beam before entering said free-space, for forming a plurality of point sources of light spreading said beam over a broad solid angle, a detector associated with each of said terminals, each said detector having means for detecting a specific reception wavelength band of radiation, each of said terminals having means for demodulating said specific wavelength band of radiation, each of said terminals being associated with said specific detection wavelength band, with said detection wavelength band of any one of said plurality of terminals being mutually exclusive of said detection wavelength bands associated with the remaining terminals, and wavelength tuning means associated with each of said terminals for selecting a particular transmission wavelength band of said source coinciding with said specific detection wavelength band of a terminal which is to receive data transmitted by said source.

5. The system of claim 4 wherein said laser diode source is a tunable laser diode.

6. The system of claim 4 wherein said laser diode source is a plurality of laser diodes, each of said diodes having a different particular transmission wavelength band.

7. The system of claim 4 wherein said means for detecting a specific reception wavelength band includes a narrow band spectral filter disposed in front of said detector.

8. The system of claim 4 wherein said means for detecting a specific reception wavelength band includes a wavelength selective photodetector.

9. The system of claim 4 wherein said means for emitting a modulated output beam includes means for modulating said beam at frequencies of at least a gigahertz.

10. The network of claim 4 wherein said laser diode source includes a gain region and further including means, in electrical communication with said gain region, for injecting a modulated current into a sub-portion of said gain region to modulate said output at a frequency of at least one gigahertz.

11. A wireless communication network comprising, a plurality of separate terminals, each having band selection means for associating said each terminal and a second terminal of said plurality of terminals with respect to a unique pair of wavelength bands of light over which said two terminals communicate, each said terminal and said second terminal thereby being in optical communication with respect to said pair of wavelength bands, a transmitter and receiver, said band-selection means including a laser diode source and means for detecting radiation, said transmitter having means for sending data to a separate terminal by modulating said output, said receiver having means for demodulating radiation detected to derive data transmitted from a separate terminal, and means, optically coupled to said transceiver for broadcasting said beam over a broad solid angle, said broadcasting means including a translucent body optically coupled to said laser diode source, said body having disposed therein a plurality of light scattering particles.

12. The network of claim 11 wherein said laser diode source includes a gain region and said sending means includes means, in electrical communication with said gain region, for injecting a modulated current into a sub-portion of said gain region to modulate said output at a frequency of at least one gigahertz.

13. A wireless communication network comprising:

at least one transmitter, said transmitter containing at least one laser diode source having a waveguide adapted to produce a beam of coherent light;

means, disposed adjacent to said waveguide to intercept said beam before entering free space, for spreading said beam over a broad solid angle to generate divergent radiation, said spreading means including a lens;

at least one receiver means capable of detecting said divergent radiation; and means for modulating and demodulating said radiation associated respectively with said transmitter and said receiver.

14. The network of claim 13 wherein said laser diode source includes a gain region and said modulating means includes means, in electrical communication with said gain region, for injecting a modulated current into a sub-portion of said gain region to modulate said output at a frequency of at least one gigahertz.

15. The network of claim 13 wherein said at least one laser diode source emits over one watt of power.

16. The network of claim 13 wherein said at least one laser diode source is adapted to produce light at multiple wavelengths.

17. The network of claim 13 wherein said at least one laser diode source includes a flared gain region.

18. The network of claim 13 wherein said modulating and demodulating means modulates said radiation with a signal having a frequency in excess of 1 MHz.

19. The network of claim 13 wherein said at least one receiver means includes a light detecting semiconductor and said network further includes a wavelength selection means, operably disposed with respect to said at least one receiver means, for limiting the wavelength of light said light detecting semiconductor may sense.

20. A wireless communication network comprising:

at least one transmitter, said transmitter containing at least one laser diode source;

dispersing means for dispersing over a wide angle radiation emitted from said laser diode source;

a safety means for disabling said laser diode source in the absence of said dispersing means;

at least one receiver means capable of receiving said dispersed laser source radiation; and means for modulating and demodulating said radiation associated respectively with said transmitter and said receiver.

21. The network of claim 20 wherein said modulating and demodulating means modulates said radiation with a signal having a frequency in excess of 1 MHz.

22. The network of claim 20 wherein said receiver means includes a light detecting semiconductor and further including a wavelength selection means, operably disposed with respect to said receiver means, for limiting the wavelength of light said semiconductor may sense.

23. The network of claim 22 wherein said semiconductor produces electrical signals representing light sensed and said receiver means includes an electronic filtering means for enhancing a signal-to-noise ratio of said electrical signals.

24. The network of claim 20 wherein said dispersing means is an end of a fiber optic cable distally disposed with respect to said at least one laser diode source.

25. The network of claim 20 wherein said laser diode source includes a waveguide adapted to emit a beam with said dispersing means disposed adjacent to said waveguide in a path of said beam exiting therefrom.

26. The network of claim 25 wherein said dispersing means includes a lens having first and second areas, with said first area having a first index of refraction, and said second area having a second index of refraction with said first index of refraction being greater than said second index of refraction.

27. The network of claim 25 wherein said dispersing means includes a translucent body having disposed therein a plurality of light scattering centers.

28. The network of claim 25 further including a plurality of transmitters and a plurality of receivers with each of the transmitters including a laser diode source with each laser diode source adapted to emit a wavelength band of light mutually exclusive of a wavelength band of light emitted by each of the remaining separate laser diode sources.

29. The network of claim 25 further including a plurality of transmitters and a plurality of receivers with each of the transmitters including a laser diode source, with each of said laser diode sources being in optical communication with a plurality of separate terminals with each transmitter including both means for driving said laser diode source associated therewith to emit light having differing wavelengths and each of said receivers include a wavelength selective filter to limit the wavelength of light said detecting means may sense to a single range of wavelengths.

30. The network of claim 29 wherein each of said laser diode sources comprises of a plurality of laser diodes, each of said diodes having a different particular transmission wavelength band.

31. The network of claim 29 wherein each of said plurality of receivers have a tunable wavelength detection system adapted to detect radiation from each of said plurality of transmitters during separate intervals of time.

32. The network of claim 29 wherein each of said plurality of transmitters includes a tunable wavelength transmission system adapted to disperse radiation to each of said plurality of receivers during separate intervals of time.

33. The network of claim 20 wherein said safety means is a switch positioned adjacent to said means to disperse.

34. A free space communication system comprising:

means for transmitting a modulated optical signal, said transmitting means including a semiconductor radiation source, means, in data communication with said transmitting means, for detecting said optical signal, said detecting means including a wavelength selective filter positioned to restrict radiation sensed by said detecting means to a predefined band of wavelengths;

means, in data communication with said detecting means, for demodulating said optical signal and converting said optical signal to an electrical signal; and a light scattering medium optically coupled to said radiation source to disperse said optical signal over a broad solid angle before reaching said free space, said light scattering medium including a translucent body having disposed therein a plurality of light scattering centers.

35. The free space communication system of claim 34 wherein said radiation source comprises a wavelength tunable semiconductor laser.

36. The free space communication system of claim 34 wherein said wavelength selective filter comprises a grating.

37. The free space communication system of claim 34 wherein said wavelength selective filter comprises a bandpass filter.

38. A network having a plurality of terminals, said network comprising:

a first terminal having a transmitter and a receiver;

a second terminal which is remotely located from the first terminal, said second terminal having a transmitter and a receiver;

each transmitter broadcasting angularly dispersed optical signals from a laser source into free space, said optical signals having sufficient power to be sensed by a receiver in a remotely located terminal;

said terminals being located in different rooms separated by a wall; and a relay device in the wall for re-broadcasting optical information from a terminal in one room to a terminal in another room, said relay device including a laser having an input region, a laser cavity and an output region; a filter on the input region for allowing a given wavelength of light to enter the laser cavity, with the laser cavity serving to amplify and re-broadcast signals of said given wavelengths to the terminal in the other room.

39. A network having a plurality of terminals, said network comprising:

a first terminal having a transmitter and a receiver;

a second terminal which is remotely located from the first terminal, said second terminal having a transmitter and a receiver; and each transmitter broadcasting angularly dispersed optical signals from a laser source into free space, said optical signals having sufficient power to be sensed by a receiver in a remotely located terminal and wherein said transmitter includes a laser source that emits infrared light having a plurality of different wavelengths.

40. The network of claim 39 wherein the transmitter includes a laser diode whose output is tuneable to selected optical wavelengths.

41. The network of claim 39 wherein the transmitter includes at least one laser diode source for generating a beam, with said transmitter further including a dispersing device for angularly dispersing the beam from the laser diode source over an angle of at least 45 degrees.

42. The network of claim 41 wherein said dispersing device comprises a light scattering surface.

43. The network of claim 41 wherein said dispersing device comprises a body of translucent material having particles dispersed therein.

44. The network of claim 41 wherein said dispersing device comprises a lens.

45. The network of claim 41 wherein the transmitter includes a safety switch for disabling the laser diode source in the absence of the dispersing device.

46. The network of claim 39 wherein the terminals are located in different rooms separated by a wall, and wherein said network further comprises:

a relay device in the wall for rebroadcasting optical information from a terminal in one room to a terminal in another room.

47. The network of claim 46 wherein the relay device comprises:

a laser having an input region, a laser cavity and an output region; a filter on the input region for allowing a given wavelength of light to enter the laser cavity, with the laser cavity serving to amplify and rebroadcast signals of said given wavelength to the terminal in the other room.

48. The network of claim 39 wherein each receiver comprises:

a photodetector; and a filter for filtering optical wavelengths from the photodetector except for wavelengths associated with the network terminals.

49. The network of claim 39 wherein the angularly dispersed optical signals have sufficient power to reflect off of at least one surface before being sensed by the remote receiver.

50. The network of claim 49 wherein the laser source generates a beam, said beam being angularly dispersed sufficiently to prevent damage to the eyes of persons within the free space.

51. A network having a plurality of terminals optically communicating with each other, said network comprising:

a transmitter, in at least one terminal, for selectively transmitting information over a multiplicity of different optical wavelengths;

said wavelengths being transmitted into free space;

at least one receiver means capable of detecting said light wavelengths;

means for modulating and demodulating said light wavelengths associated respectively with said transmitter and said receiver;

said network characterized in that said transmitter provides for modulation of a light beam of at least one of said optical wavelengths independent of modulation of any other of said wavelengths.

52. The network of claim 51 further comprising light dispersing means to spread at least some of the light wavelengths over a broad solid angle.

53. The network of claim 51 wherein the at least one receiver contains a wavelength selective filter.

54. The network of claim 53 wherein the at least one receiver filter allows passage of at least one wavelength and blocks at least one wavelength produced by said transmitter.

55. The network of claim 51 wherein said transmitter includes a laser which emits at least two different wavelengths.

56. The network of claim 51 wherein a lens is positioned in front of said light beam to spread the beam over a broader solid angle as it emerges from said laser.

57. The network of claim 51 wherein said transmitter contains a semiconductor laser.

58. A network having a plurality of terminals, said network comprising:

a first terminal having a transmitter and a receiver;

a second terminal which is remotely located from the first terminal, said second terminal having a transmitter and a receiver; and each transmitter broadcasting angularly dispersed optical signals from a laser source into free space, said optical signals having sufficient power to be sensed by a receiver in a remotely located terminal, said transmitter including at least one laser diode source for generating a beam, with the transmitter further including a body of translucent material having particles dispersed therein for angularly dispersing the beam from the laser diode source over an angle of at least 45 degrees.

59. The network of claim 58 wherein the transmitter includes a safety switch for disabling the later diode source in the absence of the dispersing device.

* * * * *